(12) United States Patent
Ray

(10) Patent No.: US 8,091,594 B2
(45) Date of Patent: Jan. 10, 2012

(54) HANDS FREE DEVICE FOR FILLING TANKS

(76) Inventor: Andrew G. Ray, Piqua, OH (US)

( * ) Notice: Subject to any disclaimer, the term of this patent is extended or adjusted under 35 U.S.C. 154(b) by 1399 days.

(21) Appl. No.: 11/652,958

(22) Filed: Jan. 12, 2007

(65) Prior Publication Data

US 2007/0175541 A1 Aug. 2, 2007

Related U.S. Application Data

(60) Provisional application No. 60/763,447, filed on Jan. 30, 2006.

(51) Int. Cl.
*B65B 1/04* (2006.01)

(52) U.S. Cl. ........ 141/347; 141/346; 141/382; 141/383; 141/384

(58) Field of Classification Search .................. 141/346, 141/347, 374, 382–384; 222/464.1, 566–574
See application file for complete search history.

(56) References Cited

U.S. PATENT DOCUMENTS

| | | | | |
|---|---|---|---|---|
| 1,959,695 A | * | 5/1934 | Sweetland | 222/157 |
| 3,774,654 A | * | 11/1973 | Hjermstad | 141/42 |
| 4,548,344 A | * | 10/1985 | Hestehave et al. | 222/464.3 |
| 5,597,021 A | * | 1/1997 | Crossdale et al. | 141/346 |
| 5,694,988 A | * | 12/1997 | Collins | 141/59 |
| 5,765,612 A | * | 6/1998 | Morin | 141/383 |
| 5,816,298 A | * | 10/1998 | Stricklin et al. | 141/346 |
| 6,142,345 A | * | 11/2000 | Laible | 222/189.1 |
| 7,384,005 B1 | * | 6/2008 | Caine et al. | 239/229 |
| 7,458,400 B2 | * | 12/2008 | Weh et al. | 141/94 |
| 7,854,354 B2 | * | 12/2010 | Laible | 222/325 |

\* cited by examiner

*Primary Examiner* — Timothy L Maust
(74) *Attorney, Agent, or Firm* — David J. Wilson

(57) ABSTRACT

The present invention relates to novel devices and methods of filling tanks designed for holding non-hazardous fluids, especially tanks on recreational vehicles. In a preferred embodiment, the tank to be filled is a water tank. The device of the present invention incorporates several novel and non-obvious features to create a device that permits the filling of tanks in a hands-free manner while keeping water waste to a minimum and preventing the damaging of tank, fill neck or other tank or fill components due to the over filling of the tank.

17 Claims, 4 Drawing Sheets

HANDS FREE DEVICE FOR FILLING TANKS

STATEMENT OF PRIORITY

This Application claims the benefit of Provisional Application No. 60/763,447, filed Jan. 30, 2006.

BACKGROUND OF INVENTION

A recreational vehicle such as a motor home, camper or boat, or concession trailers, food service trailers, etc., must, by necessity, carry everything the occupants need onboard. This means that food, water and waste is carried on the vehicle until the occupants are able to re-supply provisions and discard the wastes. Food is physically carried onboard, dry waste is carried out while wet waste is pumped or drained into appropriate sanitation facilities. Water must be transported in one or more tanks on the vehicle and must be refilled as required. Traditionally, water tanks on a recreational vehicle are filled with a hose. The end of the hose is placed into the fill neck of the tank while the person filling the tank holds the hose and waits for the tank to fill. If the process is not watched carefully (for example, the person leaves to do something else), the hose may slip out wasting water and creating a mess, the tank may overflow or, if something has been used to keep the hose from slipping out, the tank or fill neck may rupture or other equipment (such as a gauge mechanism located in the tank) may be damaged.

What is needed is a safe and secure device and method of filling tanks on, for example, recreational vehicles that does not require a person to keep watch over the process and while also ensuring that water is not wasted and no damage occurs to the tank or tank components.

SUMMARY OF INVENTION

The present invention relates to novel devices and methods of filling tanks designed for holding non-hazardous fluids, especially tanks on, for example, recreational vehicles (RV). Non-limiting examples of suitable vehicles are motor homes, campers or boats, or concession trailers, food service trailers, etc. In a preferred embodiment, the tank to be filled is a water tank. The device of the present invention incorporates several novel and non-obvious features to create a device that permits the filling of tanks in a hands-free manner while keeping water waste to a minimum and preventing damage to the tank, fill neck or other components due to the over filling of the tank.

In one embodiment, the device of the present invention enables a hose (e.g., an RV fresh water hose or garden hose) to be securely fastened to the fresh water fill spout on an RV for water tank filling purposes and controls the gallons per minute of water to prevent damage to the tank or other components.

The device on the present invention comprises, in one embodiment, a cylindrical housing comprising two ends wherein one end comprises, for example, a barbed fitting and the other end comprises, for example, a screw fitting (e.g., for attachment to a hose), said cylindrical housing also comprising, in one embodiment, i) a filter assembly and a shut off valve and ii) a self-regulating flow control device, said cylindrical housing further comprising a vented cap, said vented cap positioned between said barbed fitting and said screw fitting and designed to couple said device to said tank or to a tank fill neck. The cylindrical housing of the present device may be angled. The cylindrical housing is not limited to any particular angle and said angle can be determined by the use of the device. For example, depending on the position of the fill neck of the tank to be filled, it may be beneficial or convenient if the cylindrical housing is angled such that the end of the housing distal from the fill fitting (i.e., the screw fitting of the device of the present invention) is easier to attach a fill hose. In a preferred embodiment, the cylindrical device of the present invention comprises a "hose swivel." A hose swivel is an angled coupling designed to be attached to another fitting at any rotation so that the angled portion of the cylindrical device may point, for example, up, down, left or right. See, e.g., FIG. 1B and FIG. 2, no. 18.

In another embodiment, the device of the present invention is not limited by the length or diameter of the device. In one embodiment, the device is about 4 inches long and about 1 inch in diameter but may be any length necessary for the proper attachment of the device to the neck of the tank to be filled and to the supply hose while permitting operation of the device.

In one embodiment, the filter assembly and the shut off valve are located proximal to the end comprising the screw fitting. In another embodiment, the self-regulating flow control device is located proximal to the end comprising the barbed fitting.

The device of the present invention, in another embodiment, comprises a screw fitting that is sized to attach to a standard garden hose. The garden hose (and, therefore, the associated screw fitting) may be selected from any size including, but not limited to, a diameter of ½ inch, ⅝ inch, ¾ inch or 1 inch. In other countries, regions and areas the screw fitting and compatible hose would be selected from sizes available in that country, region or area.

The device of the present invention, in another embodiment, comprises a barbed fitting in the portion of the device that is placed into the tank neck when the device is in use. In other embodiments, the portion of the device that is placed into the tank neck may be tapered or may be a screw fitting. The device is not limited by the shape of the portion of the device that is placed into the tank neck as long as a hose may be slipped onto or otherwise attached to the device, if that is what is wanted or required for filling the tank.

The device of the present invention may also have a shut off valve incorporated into the device. The shut off valve permits the operator to start and stop the flow of the fluid (e.g., water) without having to travel back and forth to the source to start and stop the flow. In a preferred embodiment the valve is a ball valve but the device is not limited to any particular type of valve as long as the valve will control the flow of the fluid and is compatible with the fluid (i.e., it will not corrode or degrade appreciably when exposed to the fluid).

The device of the present invention also comprises a flow regulating device, preferably a self-regulating flow control valve (also referred to as a self-regulating flow controller or a pressure compensating flow controller). Such devices are designed to limit the flow of a fluid by creating a restriction in the flow pathway. The self-regulating flow controller of the present invention is designed to give a constant flow rate (for example, 2 gallons per minute) regardless of downstream (i.e., input) fluid pressure. Thus, the self-regulating flow controller, in one embodiment, would ensure a flow of water at a rate of, e.g., 2 gallons per minute regardless if the downstream water pressure was, e.g., from less than 1 psi (pounds per square inch) to about 100 psi. Non-limiting examples of suitable flow control devices are model numbers FC72HM and FC72HM-II manufactured by Hendrickson Brothers, Corona, Calif. One practiced in the art will understand that other similar devices will be suitable for use in the present invention.

In the device of the present invention, in one embodiment, the self-regulating flow control device is placed in the fluid flow path and sized to fit the diameter of the device of the present invention. For example, if the device of the present invention has an internal diameter of ¾" then the self-regulating flow control device would be sized to fit that diameter. The self-regulating flow control device of the present invention may regulate fluid flow from about 0.15 gallons per minute to about 5.0 gallons per minute. In a preferred embodiment, the self-regulating flow control device of the present invention may regulate the fluid flow from about 1.0 to 4.0 gallons per minute. In a more preferred embodiment, the self-regulating flow control device of the present invention regulates the fluid flow from about 1.5 to 3.0 gallons per minute. In a most preferred embodiment, the self-regulating flow control device of the present invention regulates the fluid flow at about 2.0 gallons per minute.

The device of the present invention also comprises a means for attaching the device to the fill neck of the tank to be filled. The device of the present invention is not limited to any particular means for attaching the device of the present invention to the fill neck of the tank to be filled as long as the device of the present invention can be securely attached during the fill operation and removed thereafter. In one embodiment, the means for attaching the device to the fill neck of the tank to be filled comprises a screw cap-type fitting (i.e., a cap that must be turned at least 1 full turn to be secured) or a twist cap-type fitting (i.e., a cap that need be turned less than one full turn to be secured). The screw cap-type or twist cap-type filling may turn about ¼ or more turns to secure it to the fill neck. There is no limit to the number of turns required to attach the device to the fill neck so long as the screw cap-type or twist cap-type fitting is compatible with the fill neck and secures the device to the fill neck without appreciable danger of the device becoming dislodged or unattached during the fill operation. Other known fill spouts on RVs and similar vehicles include push-in plug type fittings and screw-in (threaded) fittings. One skilled in the art will realize that the device of the present invention may be designed to be used with these fittings as well.

In one embodiment, the screw cap-type or twist cap-type fitting (or other suitable, compatible fitting) for attaching the device of the present invention to the fill neck of the tank to be filled also comprises one or more vent holes. The vent holes are sized to permit air to exit the tank as it filled with fluid (e.g., water). In another embodiment, the vent holes are sized to allow the egress of the fluid in the event the tank is filled and the fluid supply is not shut off. Thus, in a preferred embodiment, the vent holes permit at least the same rate of fluid flow (gallons per minute) or greater as the self-regulating flow device of the present invention. This embodiment ensures that the tank will not become damaged if the fluid supply is, for example, inadvertently left on after the tank is full since the fluid will have an means for exiting the tank that will permit the egress of the fluid at a rate comparable to the rate of fluid flow into the tank.

The device of the present invention, in one embodiment, is capable of being disassembled into component parts. Disassembling the device of the present invention into component parts permits, for example, the replacement of damaged or worn parts, the exchange of a different size self-regulating flow device, cleaning, etc. In a preferred embodiment, the device incorporates one or more screw fittings for disassembly and reassembly.

Although, the device of the present invention may be used for any number of applications wherein it may be necessary to fill a tank with fluid, in a preferred embodiment, the device is used for the filling of water tanks on recreational vehicles such as, for example, campers, motor homes, yachts and other boats, air craft (esp., small private air craft) and portable water tanks that may be used in such vehicles, especially wherein the tanks are to be filled with, for example, a garden hose.

The device of the present invention may comprise (i.e., be made from) any material that is compatible with the fluid being used. For example, the device may comprise a metal selected from the group consisting of brass, copper, steel, stainless steel, nickel, bronze, aluminum or an alloy or mixture thereof and/or it may comprise one or more types of plastic.

In one embodiment, the device of the present invention comprises a filter or filter assembly comprising a filter. The filter of the present invention is sized to fit into the flow path of the fluid being conveyed by the device of the present invention. In one embodiment, the filter is made of a material that is easily cleanable and does not restrict the flow of the fluid to a flow rate less than the rate generated by the self-regulating flow device of the present invention. In a preferred embodiment, the filter comprises a metal screen wherein, for example, the metal screen is held in place by a washer (e.g., a rubber or plastic washer) or the filter comprises a washer.

The present invention is also directed towards a method for filling a tank with fluid. In one embodiment the method comprises a) attaching to a tank fill opening (e.g., the tank fill neck) a device comprising: i) a cylindrical housing comprising two ends wherein one end comprises a barbed fitting and the other end comprises a screw fitting, said cylindrical housing also comprising ii) proximal to the end comprising the screw fitting a filter assembly and a shut-off valve and iii) proximal to the end comprising the barbed fitting a self-regulating flow control washer, said cylindrical housing further comprising a vented cap, said vented cap positioned between said barbed fitting and said screw fitting and designed to couple said device to said tank or to a tank fill neck; b) attaching to the screw fitting of said cylindrical housing a hose sized to fit said screw fitting; c) turning on at the source the fluid to be placed into the tank; d) opening said shut off valve located proximal to said screw fitting; e) filling the tank to a desired level; f) turning off said shut off valve located proximal to said screw fitting; g) turning off fluid at source; and h) disconnecting said hose from said screw fitting of said cylindrical housing. In a preferred embodiment, the tank to be filled is located on a recreational vehicle. In a more preferred embodiment, the tank is a fresh water tank on a recreational vehicle.

In a preferred embodiment, the device of the present invention enables a garden hose to be securely fastened to the fresh water fill spout on an RV (recreational vehicle) for the water tank filling purposes and controls the gallons per minute of water to keep from damaging the tank.

In this particular embodiment, one end of the device (called a Secure-Fill™) is attached to a garden hose with the other end inserted into the fresh water spout. A cap that is mounted on the device (Secure-Fill™) is then twisted on securely to the spout to hold the device (Secure-Fill™) and the garden hose in place. An on/off valve is used to turn the water on and off at the spout while the built in flow control disc maintains a 2 gallon per minute water flow being put into the tank.

In this particular embodiment, the main components of the invention consist of the following. Heavy-duty brass goose neck fitting with on/off valve is used to start and stop water flow and connect to garden hose. Solid brass shank garden hose mender (i.e., the piece comprising the barbed fitting as described above and below and part no. 42 in the Figures) is used to hold plastic fill spout cap in place, hold flexible PVC (polyvinyl chloride) fill tube and house the flow control disc. Plastic fill cap is used to attach Secure-Fill to water fill spout on RV. Flexible PVC tube is used to slide down into water fill spout to help make water flow smoothly into fill spout hose. The water flow control disc is used to maintain a water flow of 2 gallons per minute.

In this particular embodiment, these components work together as follows. The water flow control disc is placed into the brass shank hose mender. The brass shank hose mender is screwed on to the brass goose neck fitting. The brass shank hose mender then holds the plastic fill spout cap and the extension hose which then allows a standard garden hose to be securely fastened to an RV's fresh water tank spout for water fill up without damaging fresh water tank.

In yet another embodiment of the present invention the present inventors contemplate a device for the filling of fresh water tanks on recreational vehicles, said device comprising: a) a cylindrical device, said device comprising i) a barbed hose fitting (male or female), ii) a hose swivel, said hose swivel optionally comprising an on-off valve and a filter, iii) an attachment means for attachment of the device to a tank opening wherein said attachment means also comprises a means for venting said tank to be filled, iv) a self-regulating flow controller washer and, v) a flexible hose; b) wherein i) said female barbed hose fitting is connected to said hose swivel via a screw fitting, ii) said self-regulating flow control washer is positioned between said female barbed hose fitting and said hose swivel, iii) said flexible hose is connected to the barbed end of said female barbed hose fitting and, iv) said attachment means for attachment to said tank opening is positioned between said barbed hose fitting and said hose swivel.

DETAILED DESCRIPTION OF PREFERRED EMBODIMENTS

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

In the present invention, the terms "fill spout," "fill neck," "fill port" and "tank neck," "tank spout" and "tank port," and the like, are equivalent terms and refer to the portion of the tank wherein a fluid is added to the tank.

Figure 1:
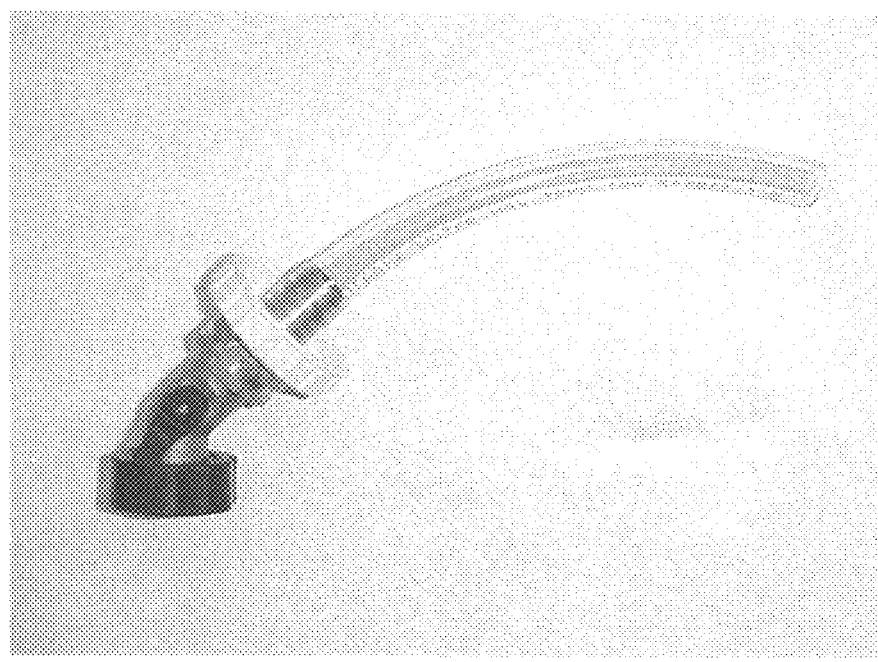
FIG. 1 shows two photographs of a preferred embodiment of the present invention. A) shows the device. B) shows the device attached to the fill spout (port) of the water tank of a recreational vehicle with a hose attached to the hose swivel of the device of the present invention.
Figure 1:
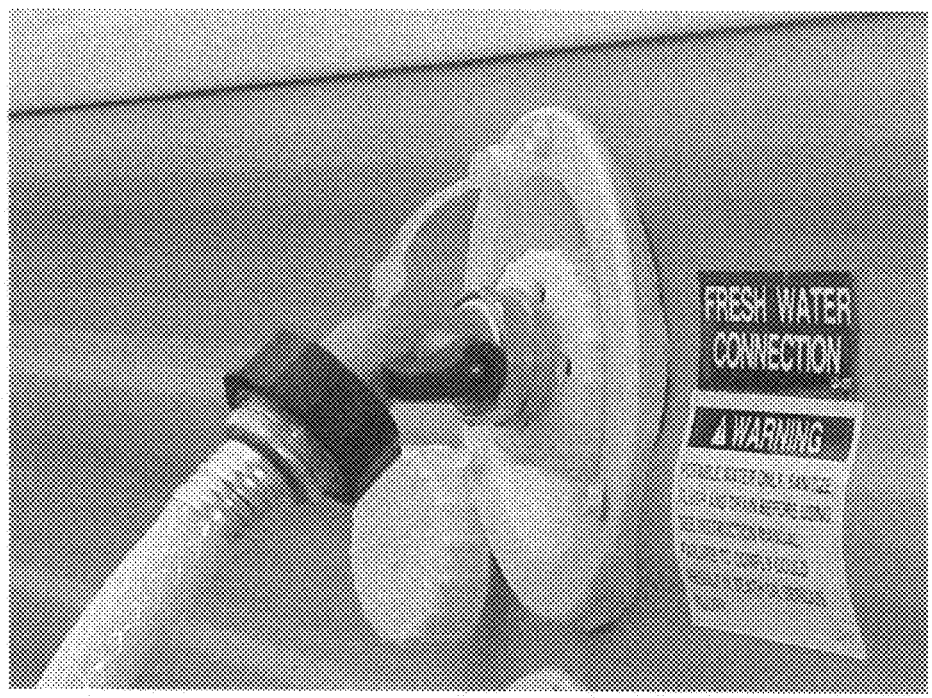
Figure 2:
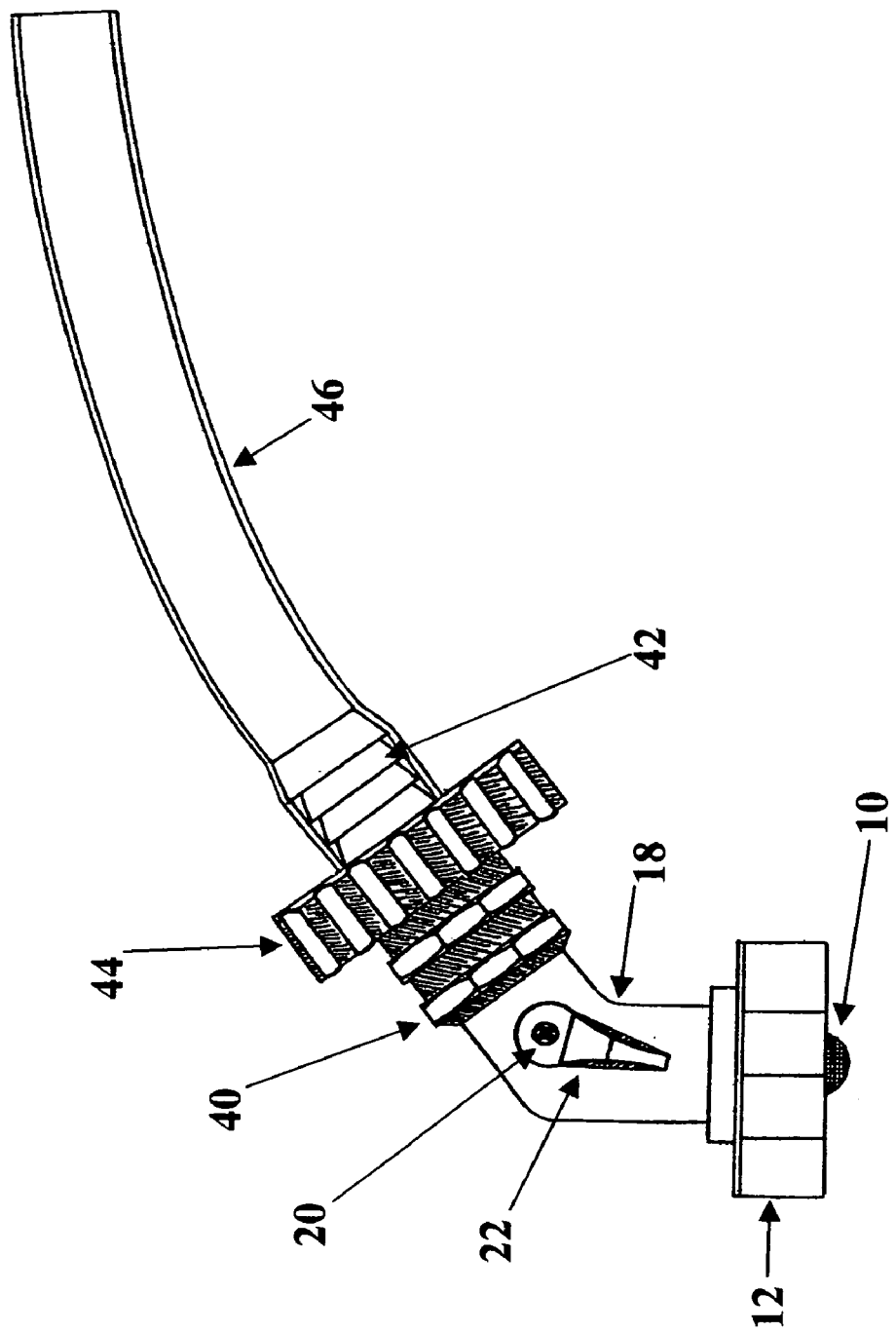
FIG. 2 shows a schematic of a preferred embodiment of the present invention. Various parts may not be to scale.

Referring now to FIG. 2, the device of the present invention comprises, in this preferred embodiment, a goose-neck shaped hose swivel 18 having a means for attachment (number 12 in the FIG. 2; number 12 is freely turnable) to, for example, a garden hose wherein said means for attachment is treaded on the inner surface (see, number 12a in FIG. 3) to couple to the threaded end of the hose. The outer surface of the attachment means may be knurled, grooved, scored, coated or covered (e.g., with rubber or plastic type materials) or otherwise made easy to grip so that the attachment means may be easily attached to said hose. Likewise, it may be shaped to accept a wrench for tightening. The goose-neck hose swivel also has (optionally) a shut-off valve 22 secured with, for example, a screw 20. Said goose-neck hose swivel is attached to a barbed fitting via, for example, mated screw threadings. A self-regulating flow control device is located, for example, between the goose-neck hose swivel and the barbed fitting. A vented cap 44 designed for attachment to the fill port (spout) of the tank to be filled is placed on the barbed fitting (see, e.g., FIGS. 1A, 1B and 2). In some uses a hose made of, for example, vinyl (e.g., polyvinyl chloride) or other plastic, is placed over the barbed fitting (see, e.g., FIGS. 1A and 2) to aid in the filling of the tank.

Figure 3:
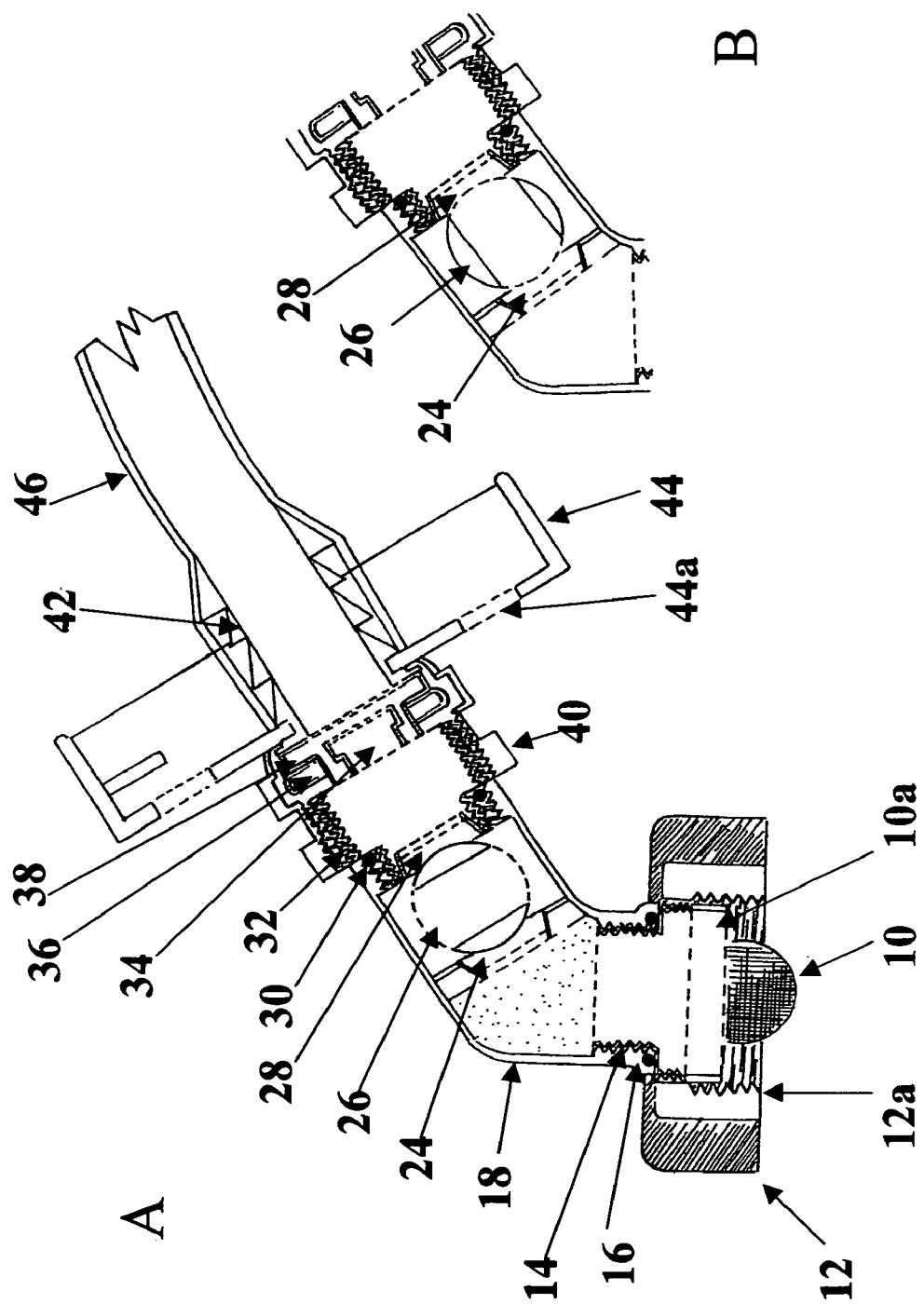
FIG. 3 shows a cut-a-way view of a preferred embodiment of the present invention. Various parts may not be to scale.

FIG. 3A shows a cross sectional view of a preferred embodiment of the device of the present invention. This figure shows an optional filter 10 designed as part of the washer 10a used to seal the device to a hose. Also visible in FIG. 3 is the shut-off ball valve 26 in the closed position and two Teflon™ seals 24 and 28 that hold the ball valve in place and allow it to move freely when turned by an operator. Threaded pieces 14 and 32 are also shown. These pieces are used to hold attachment means 12 and barbed fitting 42, respectively, on to the goose-neck. Threaded pieces 14 and 32 are sealed to prevent leaks with O-rings 16 and 30, respectively. FIG. 3A also shows the location of the self-regulating flow controller clearly as numbers 34, 36 and 38. Two vents 44a are visible in vented cap 44. FIG. 3B shows shut-off valve ball bearing 26 in the opened position.

Figure 4:
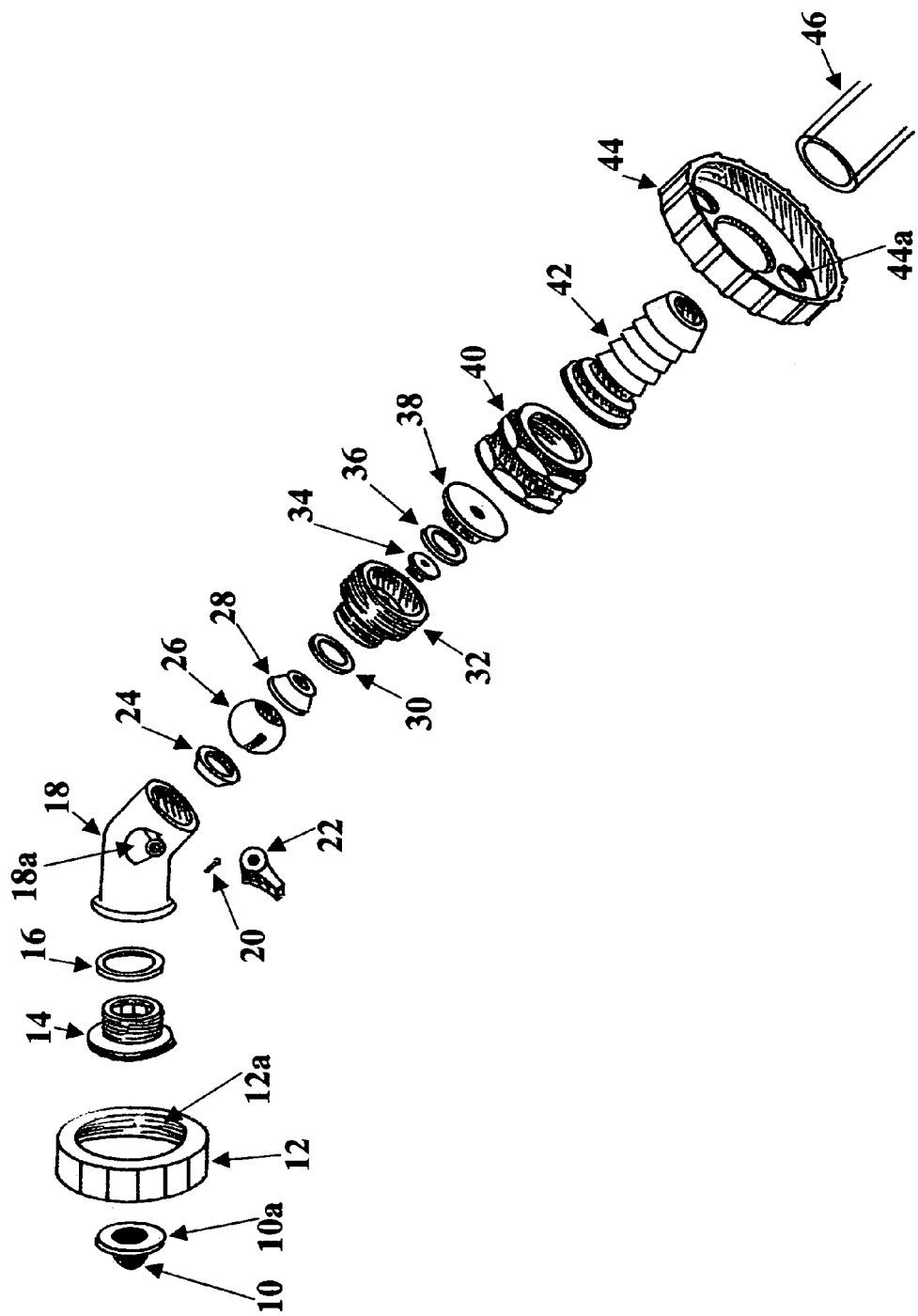
FIG. 4 shows an exploded view of a preferred embodiment of the device of the present invention. Various parts may not be to scale.

FIG. 4 shows an exploded view of a preferred embodiment of the device of the present invention. The optional filter is 10 and attached to washer 10a. A supply hose attaches to attachment device 12 via screw threads 12a. Attachment device 12 is held in place between part 14 and the ridge on the end of goose-neck 18 with enough space to allow attachment device 12 to be turned freely. Part 14 screws into goose-neck 18 and is sealed with O-ring 16. Goose-neck 18 also has a projection 18a for mounting a control lever 22 for the shut-off valve. Control lever 22 is held in place with screw 20. In one embodiment, the shut-off valve may be a ball valve. Ball valve 26 has a hole through it and is designed to rotate 90 degrees when the control lever 22 is rotated 90 degrees from stop to stop. At one end of the rotation of the control lever 22 the hole in the ball bearing is lined up with the fluid path and the valve is in the opened position. At the other end of the rotation of the control lever 22 the hole in the ball bearing is perpendicular to the fluid path and the valve is in the closed position. The ball bearing is sealed to prevent fluid from flowing around the ball bearing. At opposite ends of the ball bearing are Teflon™ seals 24 and 28. Parts 24, 26 and 28 of the device are housed within the goose-neck 18 when the unit is assembled. Part 32 screws into the goose-neck 18 and holds the ball bearing valve 26 and Teflon™ seals 24 and 28 in place. Part 32 is sealed to prevent leaking with O-ring 30. The self-regulating flow controller is made of three parts 34, 36 and 38. Part 38 is a hard plastic support piece. Part 36 is a sealing washer and part 34 is a soft, flexible plastic or rubber device sized to limit the flow of a fluid to a specific rate regardless of inlet pressure. Although the present invention is not limited by theory, it is believed that the flexibility of this piece allows it to conform to increasing inlet pressures by compressing against part 38 thereby reducing the size of the fluid passage in part 34. The self-regulating flow controller (comprising numbers 34, 36 and 38) fits inside of part 40, which is threaded to screw on to part 32. Barbed fitting 42 is inserted through part 40 prior to the insertion of the self-regulating flow controller 34, 36 and 38. Screwing part 40 on to part 32 holds parts 34, 36, 38 and 42 in place and prevents leaking. Vented cap 44 is press fit over the barbed fitting 42 and oriented such that is can be connected to the fill spout (port) of the tank to be filled. Flexible hose 46 is press fit on to the barbed fitting 42.

FIG. 1A shows a preferred embodiment of the device before being placed in service. FIG. 1B shows a preferred embodiment of the device being used to fill a fresh water tank on a recreational vehicle.

One skilled in the art will realize that other embodiments of the present invention are possible and that these other embodiments are considered variations of the present invention within the skill of one in the art to practice based on the teachings found in this specification.

What is claimed is:

1. A device for filling tanks, said device consisting of:
an essentially cylindrical housing having a first opened end having a screw fitting and a second opened end having a barbed fitting, said cylindrical housing also having and positioned between said first opened end and said second opened end i) a filter assembly, ii) a shut-off valve and iii) a self-regulating flow control device, said cylindrical housing further comprising a vented cap, said vented cap positioned between said first opened end and said second opened end and designed to couple said device to a tank or to a fill neck of said tank.

2. The device of claim 1, wherein said filter assembly and shut-off valve are proximal to the screw fitting end.

3. The device of claim 1, wherein said self-regulating flow control device is proximal to the barbed fitting end.

4. The device of claim 1, wherein said self-regulating flow control device is downstream of said filter assembly and said shut-off valve.

5. The device of claim 1, wherein said screw fitting is sized to attach to a garden hose.

6. The device of claim 5, wherein said screw fitting is sized to attach to a garden hose having a diameter of ½ inch, ⅝ inch, ¾ inch and 1 inch in diameter.

7. The device of claim 1, wherein said barbed fitting is fitted to a slip hose.

8. The device of claim 1, wherein said shut-off valve is a ball valve.

9. The device of claim 1, wherein said device is capable of being disassembled into component parts.

10. The device of claim 1, wherein said tank to be filled is located on a recreational vehicle.

11. The device of claim 10, wherein said tank is a fresh water tank.

12. The device of claim 1, wherein said cylindrical housing is made at least in part from a metal selected from the group consisting of: brass, copper, steel, stainless steel, nickel, bronze, aluminum or an alloy or mixture thereof.

13. The device of claim 1, wherein said cylindrical housing is made at least in part from plastic.

14. A device for the filling of fresh water tanks on recreational vehicles, said device consisting of:
  a. a cylindrical device, said device having i) a barbed hose fitting, ii) a hose swivel, said hose swivel having an on-off valve and a filter, iii) an attachment means for attachment of the device to a tank opening wherein said attachment means also having a means for venting said tank to be filled, iv) a self-regulating flow control washer and, v) a flexible hose;
  b. wherein i) said female barbed hose fitting is connected to said hose swivel via a screw fitting, ii) said self-regulating flow control washer is positioned between said female barbed hose fitting and said hose swivel, iii) said flexible hose is connected to the barbed end of said female barbed hose fitting and, iv) said attachment means for attachment to said tank opening is positioned between said barbed hose fitting and said hose swivel.

15. A method for filling a tank with fluid, said method comprising:
  a. attaching to a tank fill opening a fill device consisting of: i) a cylindrical housing having two ends wherein one end having a barbed fitting and the other end having a screw fitting, said cylindrical housing ii) proximal to the end comprising the screw fitting a filter assembly and a shut-off valve and iii) proximal to the end having the barbed fitting a self-regulating flow control washer, said cylindrical housing further having a vented cap, said vented cap positioned between said bathed fitting and said screw fitting and designed to couple said device to said tank or to a tank fill neck;
  b. attaching to the screw fitting of said cylindrical housing a hose sized to fit said screw fitting;
  c. turning on at the source the fluid to be placed into the tank;
  d. opening said shut off valve located proximal to said screw fitting;
  e. filling the tank to a desired level;
  f. turning off said shut off valve located proximal to said screw fitting;
  g. turning off fluid at source;
  h. disconnecting said hose from said screw fitting of said cylindrical housing; and
  i. removing said fill device from said tank.

16. The method of claim 15, wherein said tank to be filled is located on a recreational vehicle.

17. The method of claim 16, wherein said tank is a fresh water tank.

* * * * *